United States Patent [19]

Murawski et al.

[11] 3,922,056

[45] Nov. 25, 1975

[54] MOUNTING ARRANGEMENT FOR INTERFERENCE SUPPRESSION AND SHIELDING A MULTIPLICITY OF ELECTRICAL LINES

[75] Inventors: Kurt Murawski; Rolf Hagen; Claus-Peter Heitzig, all of Munich; Jurgen Weiss, Unterhaching, all of Germany

[73] Assignee: Siemens Aktiengesellschaft, Berlin and Munich, Germany

[22] Filed: Sept. 20, 1973

[21] Appl. No.: 399,267

[30] Foreign Application Priority Data

Sept. 28, 1972 Germany............................ 2247681

[52] U.S. Cl........... 339/143 R; 339/121; 339/136 M

[51] Int. Cl.².......................................... H01R 23/06

[58] Field of Search ........... 339/128, 136, 141, 143, 339/121

[56] References Cited

UNITED STATES PATENTS

| | | | |
|---|---|---|---|
| 3,213,406 | 10/1965 | Just et al. | 339/136 M X |
| 3,329,925 | 7/1967 | Johnson et al. | 339/143 R X |
| 3,391,381 | 7/1968 | Livingston | 339/143 R |

*Primary Examiner*—Richard E. Moore

[57] ABSTRACT

A mounting arrangement for providing interference suppression on a multiplicity of electrical lines and permitting them to be connected through a shielded wall. For a given number of lines on which disturbances appear there is provided an anti-interference module on which are mounted anti-interference components connected to the individual lines. The module includes a shielded area into which extend output terminals of the anti-interference components. This shielded area ends in a screen cover enclosing a multiple socket connector strip, the terminals of which are connected to output terminals of anti-interference components over lines running in the aforementioned shielded area. In the shielded wall there are provided openings having dimensions corresponding to those of the screen cover. Thus, the screen covers and thereby the anti-interference modules can be inserted in these openings.

3 Claims, 3 Drawing Figures

MOUNTING ARRANGEMENT FOR INTERFERENCE SUPPRESSION AND SHIELDING A MULTIPLICITY OF ELECTRICAL LINES

BACKGROUND OF THE INVENTION

This invention relates to apparatus for interference suppression of a multiplicity of electrical lines and the substantially interference-free wiring of them through an electrically shielding wall.

In electrically shielded rooms wherein, for example, electronic devices are accommodated, it is frequently necessary to lead electrical lines out of the shielded room, whereby lines containing disturbances in the shielded rooms must first be cleared and subsequently guided outwardly through the screening wall in a substantially interference-free manner. To suppress interference on the lines, special anti-interference components are utilized which are connected to the disturbed lines, and these components have interference-proof outlets which are connected to shielded cables leading through the screening wall.

If a large number of lines are to be suppressed and guided through an interference-proof screening wall, it is technically inconvenient to guide each individual line through the screening wall over separate shielded cables.

It is, therefore, an object of the invention to provide a simple arrangement which is easy to manufacture and by means of which in a shielded room a plurality of electrical lines can be suppressed and subsequently guided through an interference-proof screening wall.

SUMMARY OF THE INVENTION

In accordance with the invention, the foregoing and other objects are achieved in that for a given number of lines containing disturbances there is provided an anti-interference module on which are mounted anti-interference components, which are connected to the individual lines. The anti-interference module has a shielded area into which are guided the outlets of the anti-interference components. The latter shielded area ends in a screen cover enclosing a multiple socket connector of the anti-interference module. The terminal connectors are connected to outlets of the anti-interference components over lines running in the shielded area of the module. In the shielding wall there are provided openings having the size of the screen cover into each of which a screen cover and, thus, an anti-interference module is capable of being inserted.

An advantageous construction of the invention is characterized by mounting two channel or U-shaped girders, contiguous with one another via the back walls. In the back walls of the U-girders there are provided openings having the size of the screen cover of an anti-interference module. The leg ends of the U-girders square off inwardly, and in the squared off portion grooves and openings are machined, through which the anti-interference modules and the plugs, which are inserted into the connector strip are guided and held.

According to a further development of the invention, a spring clip is mounted on the upper and lower end of the openings into the back walls of the U-girders which establishes a low-resistance electrical connection between the screen cover and the U-girders, with the screen cover in inserted position.

BRIEF DESCRIPTION OF THE DRAWINGS

The principles of the invention will be more readily understood by reference to the description of preferred embodiments given hereinbelow in conjunction with the accompanying drawings, wherein.

DETAILED DESCRIPTION OF THE DRAWINGS

Figure 1:
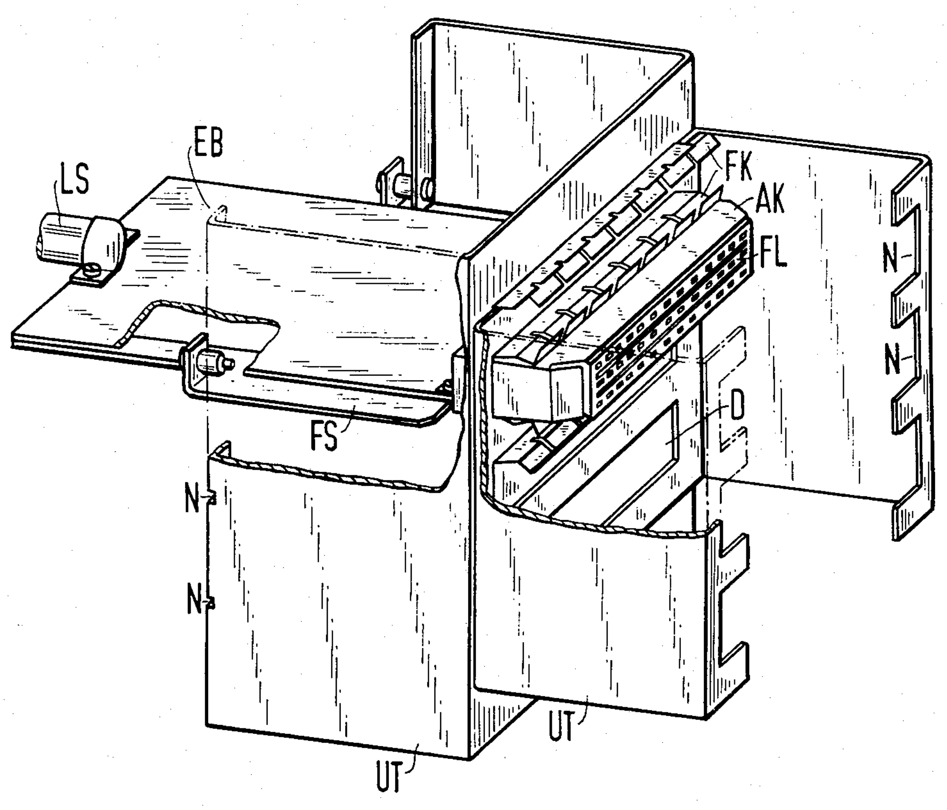
FIG. 1 is a partially cut away perspective view of an anti-interference module and a portion of the screening wall.

FIG. 1 shows, in perspective, two U-girders UT contiguous with the rear walls and an anti-interference module EB.

The anti-interference module EB comprises a printed circuit board having a multiple socket connector strip FL, anti-interference components being mounted on the printed circuit board. Either directly on or in the printed circuit board there are provided two metallic layers in the form of linings or, around the printed circuit board, in the form of sheet metal coverings. Between these metallic layers there is a shielded area AR (see FIG. 2). The connector strip is, for example, provided with a screen cover AK, which is connected to the metallic layers.

In the rear walls of the U-girders UT which adjoin one another there are disposed one above the other, and at evenly spaced intervals, openings D having the size of the screen cover AK. To establish a perfect contact between the screen cover AK and the U-girders UT forming the screening wall spring clips are mounted at the upper and lower end of the openings D. These spring clips FK are urged into an opening D against the upper and lower end of the screen cover AK upon insertion of it in opening D. The spring clip is, for example, advantageously made from one element for the upper and lower end of juxtaposed openings D, the rear side of the spring clip FK being placed between the rear walls of the two U-girders UT and attached thereat, for example, by means of a screw connection. A large-area and, hence, low-resistance grounding of the anti-interference elements is achieved by such a spring clip FK, the screen cover AK and the metallic layers.

Figure 3:
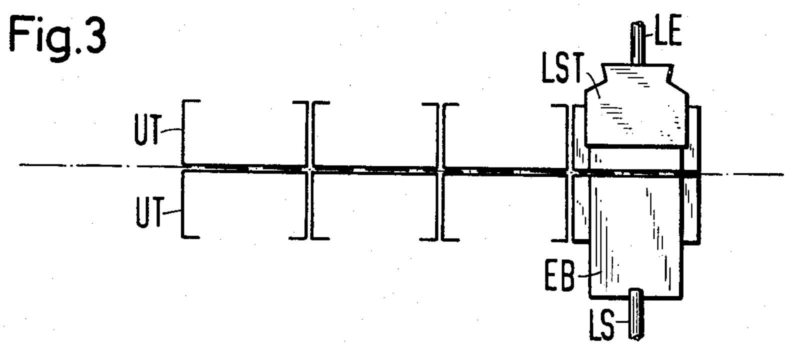
FIG. 3 is a schematic diagram of a shielding wall having one anti-interference module and one plug.

The leg ends of the U-girders UT angle off inwardly and are provided with grooves N. The grooves N serve, with respect to the left U-girder UT, for guiding and holding the anti-interference module EB which, for this purpose, is also provided on the sides with special guide rails FS. Due to the grooves in the right U-girder UT, the plugs shown in FIG. 3 are guided and held. As an additional safety for the anti-interference module EB, screw elements are mounted on the guide rails FS which can be screwed into the angled portions of the left U-girder UT.

The details of the anti-interference module EB will be more readily understood by reference to the description of a preferred embodiment given hereinbelow in conjunction with FIG. 2 of the accompanying drawing.

Figure 2:
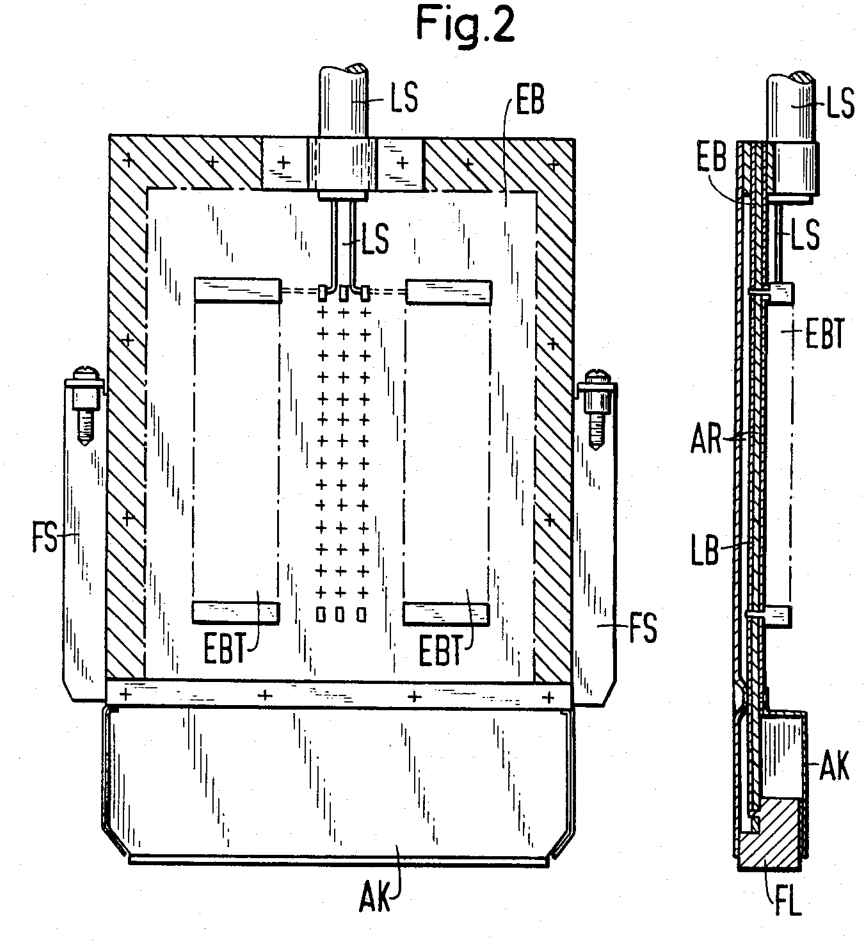
FIG. 2 is a plan view and a side cross sectional view of an anti-interference module.

The left portion of FIG. 2 shows a plan view of an anti-interference module EB, and the right portion a side cross-sectional view thereof. On the anti-interference module there are mounted anti-interference elements EBT shown only schematically herein. On the input side the anti-interference components EBT are provided with a given number of disturbed lines LS. The lines LS are guided in a cable to the anti-interference module EB and subsequently branched separately to the individual anti-interference components EBT. The printed circuit board of the anti-interference module is metallized on the side of the components and on the back side provided with a sheet metal covering, so that between the two metallic layers there is a shielded area AR. In addition, there is the possibility of providing on the back side of the printed circuit board a metallized layer, instead of the sheet metal covering. In the shielded area AR there is a further layer having conductor paths LB which are connected to the terminals of the connector strip FL mounted on the frong end of the printed circuit board. The connector strip FL is covered with a screen cover AK which is connected to the metallic layers of the printed circuit board such that the shielded area AR extends between said metallic layers into the screen cover AK.

The interference-proof outlets of the anti-interference components EBT are guided into the shielded area AR and connected therein with one of the conductor paths LB. The outlets of the anti-interference components EBT are thus shielded outwardly with the terminals of the connector strip FL.

The U-girders UT may be of any height in accordance with the size of the shielding wall. Thus, a possibility is afforded to accommodate many anti-interference modules EB one above the other in one pair of U-girders. Moreover, additional pairs of U-girders UT may be mounted in the shielding wall. An example is given schematically in FIG. 3.

FIG. 3 is a plan view of four pairs of U-girders UT in side-by-side relation. In the right pair of U-girders there are shown by way of example one anti-interference module EB and one plug LST. The plug LST is the counterpart of the connector strip FL of the anti-interference module EB. The disturbed lines LE are contained in the outlet cable of the plug LST.

The preferred embodiments described hereinabove are intended only to be exemplary of the principles of the invention. It is contemplated that they can be modified or changed, while remaining within the scope of the invention as defined by the appended claims.

We claim:

1. A mounting arrangement for providing interference suppression in a multiplicity of electrical lines and for facilitating the connection of said electrical lines through a shielding wall, comprising:

a shielding wall having at least an opening therein, electrical lines, at least one electrical component supporting module having electrical interference suppressing electrical components mounted thereon, said components having inputs electrically connected to said electrical lines and output terminals, said module including means defining an electrically shielded area having an opening therein at an end of said module, connector means joined to said module and connected to said output terminals of said components over lines extending through said shielded area, screen cover means closing said opening in said end of said shielded area and enclosing said connector means, said screen cover means having dimensions forming to those of said opening in said shielding wall so as to permit insertion of said screen cover means and thereby said module.

2. The mounting arrangement defined in claim 1 wherein at least two channel-shaped elongated members are mounted in a back-to-back relationship on said shielding wall, the back walls of said channel-shaped members having openings therethrough of the size of said screen cover means for insertion of said screen cover means, one of said channel-shaped members having grooves therein for insertion of said module and the other of said channel-shaped members having grooves therein for insertion of said connector means for external wires to be connected to said connector means.

3. The mounting arrangement defined in claim 1 further comprising spring clip means mounted in said opening for electrically contacting said screen cover means thereby establishing a low resistance electrical connection between said components and said shielding wall.

* * * * *